United States Patent [19]

Yamada

[11] Patent Number: 4,850,938
[45] Date of Patent: Jul. 25, 1989

[54] INFINITELY VARIABLE SPEED TRANSMISSION WITH A VARIABLE DIAMETER PULLEY SYSTEM

[75] Inventor: Kenichi Yamada, Tokyo, Japan
[73] Assignee: Fuji Jukogyo Kabushiki Kaisha, Tokyo, Japan
[21] Appl. No.: 284,308
[22] Filed: Dec. 13, 1988
[30] Foreign Application Priority Data Dec. 23, 1987 [JP]  Japan ................................. 62-328273

[51] Int. Cl.$^4$ ............................................ F16H 11/02
[52] U.S. Cl. ......................................... 474/28; 74/867
[58] Field of Search ..................... 474/11–13, 474/16, 18, 28, 69, 70; 74/866–869

[56] References Cited

U.S. PATENT DOCUMENTS

| | | | |
|---|---|---|---|
| 4,292,031 | 9/1981 | Rattunde | 474/28 X |
| 4,717,368 | 1/1988 | Yamaguchi et al. | 474/28 |
| 4,753,627 | 6/1988 | Kawamoto | 474/28 X |

Primary Examiner—Thuy M. Bui
Attorney, Agent, or Firm—Beveridge, DeGrandi & Weilacher

[57] ABSTRACT

A motor vehicle transmission has a pulley system comprising a variable diameter drive pulley and a variable diameter driven pulley, with an endless belt extending around the pulleys to impart the rotation of a drive shaft to a driven shaft at a speed ratio determined by the relative effective diameters of the two pulleys. A substantially tubular shell has an enlarged end secured to the movable cone of the driven pulley and a constricted end loosely fitted over the driven shaft. Rigidly mounted on the driven shaft, a partition divides the interior of the shell into an actuating fluid chamber, to be supplied with pressurized fluid for controllably moving the movable cone towards and away from the fixed cone, and a counterbalance chamber. The driven shaft has formed therein a fluid passageway with an outlet disposed in such an axial position thereon that the constricted end of the shell directs the fluid issuing therefrom into the counterbalance chamber, in order to counterbalance the centrifugal force of the fluid in the actuating chamber, when the driven shaft is in rotation at relatively high speed. When the driven shaft speed is low, the constricted end of the shell directs the fluid to the exterior of the shell for lubricating some moving parts of the transmission.

5 Claims, 3 Drawing Sheets

INFINITELY VARIABLE SPEED TRANSMISSION WITH A VARIABLE DIAMETER PULLEY SYSTEM

BACKGROUND OF THE INVENTION

This invention relates to transmissions, to infinitely variable speed transmissions, and to belt transmissions well suited for vehicular use, among other applications. More specifically, the invention deals with improvements in or relating to variable diameter pulley systems included in belt transmissions, particularly to the driven pulley and hydraulic circuit means associated therewith.

Belt transmissions have been known and used extensively on motor vehicles. They include a variable diameter pulley system comprising a drive pulley on a transmission main shaft (primary shaft) and a driven pulley on a countershaft (secondary shaft), with a V-belt extending around the two pulleys. Each V-groove pulley is divided into a pair of halves known as pulley cones. One of the pulley cones is axially displaceable towards and away from the other in order to controllably vary the effective diameter of the pulley. Hydraulic fluid pressure is usually employed for controlling the axial position of the movable pulley cone with respect to the fixed pulley cone.

Difficulties have been encountered in controlling the axial position of the movable cone of the driven pulley, in particular, as its speed of rotation becomes very high with upshifting. The hydraulic mainline fluid fed into the actuating fluid chamber of the driven pulley movable cone develops a centrifugal force such that its axial component tends to displace the movable cone in the direction opposite to the desired direction of cone movement for upshifting. It has therefore been suggested to provide a counterbalance chamber opposite the actuation chamber. This counterbalance chamber is supplied as required, with fluid under pressure, so that the centrifugal force of the fluid in the actuation chamber may be counterbalanced by that of the fluid in the counterbalance chamber.

Japanese Laid Open Patent Application No. 57-171154 represents an example of such known counterbalancing means. This prior application teaches to direct the outflow of hydraulic fluid from a torque converter into the counterbalance chamber. An objection to this scheme is that it is applicable only to transmissions of the class incorporating a hydraulic torque converter. Additionally, the outflow from the torque converter cannot possibly be passed through a fluid cooler prior to introduction into the counterbalance chamber.

Japanese Laid Open Patent Application No. 60-104848 teaches to form a counterbalance chamber providing a tubular member which concentrically surrounds the countershaft and the counterbalance chamber is slidably held against the back of a member defining the actuation chamber. This prior art device has the weakness that the area occurring centrifugal force in the counterbalance chamber is always of the smaller size than the area of the actuation chamber and so may therefore fail to develop a sufficient counterbalancing force.

Needless to say, the counterbalance chamber must be of sufficient capacity to enable the fluid therein to counteract the centrifugal force of the fluid in the actuation chamber. No less important, however, is the fact that the hydraulic fluid be infallibly fed into the counterbalance chamber whenever the need arises for cancelling the centrifugal force of the fluid in the actuation chamber. It is undesirable that, as in the second recited prior art device, part of the mainline fluid be directed into the counterbalance chamber, in view of consequent changes in the mainline pressure fed to other parts of the transmission. The counterbalance chamber should be fed from some source of fluid pressure different from the source of mainline pressure.

Belt transmissions of the type in question have had another problem that, as far as the applicant is aware, has been left unsolved Generally, in such belt transmissions, the countershaft with the driven pulley thereon is disposed considerably above the level of the transmission main shaft having the drive pulley mounted thereon, because of design requirements such as the large pulley diameters for a wide range of speed ratios obtainable and the compact arrangement of the parts within a minimum size housing Further, the countershaft is geared to a transmission output shaft because of the need for reducing the speed of rotation of the countershaft.

Conventionally, the countershaft as well as the reduction gearing has been lubricated by oil splashed by the final drive gear meshing with a pinion on the transmission output shaft. However, these moving parts have inevitably been poorly lubricated when the vehicle is traveling at low speed because then the speed of rotation of the final drive gear is also low.

SUMMARY OF THE INVENTION

The present invention simultaneously solves, in infinitely variable speed transmissions of the class defined, the problems of how to effectively prevent the fluid in the actuation chamber of the movable pulley cone from centrifugally displacing the cone during its high speed rotation, and of how to effectively lubricate the noted parts of the transmission when the transmission output speed is low.

Stated broadly, the invention provides, in an infinitely variable speed transmission of the type having a variable diameter pulley system, the combination comprising a first pulley cone mounted on a rotatable shaft for joint rotation therewith and restrained from axial displacement relative to the shaft, and a second pulley cone mounted on the shaft for joint rotation therewith and for axial displacement relative to the shaft towards and away from the first pulley cone. Coaxially surrounding the shaft is a substantially tubular shell having an enlarged end rigidly attached to the second pulley cone and a constricted end loosely fitted over the shaft. A fluid-tight partition is rigidly mounted on the shaft for dividing the interior of the shell into an actuation chamber contiguous to the second pulley cone and a counterbalance chamber opposite to the actuation chamber, the actuation chamber being supplied with fluid under pressure for controllably moving the second pulley cone, together with the shell attached thereto, toward and away from the first pulley cone. The shaft has defined therein a fluid passageway which has a fluid outlet in such an axial position on the shaft that the constricted end of the shell directs the fluid issuing from the fluid outlet either into the counterbalance chamber, in order to counterbalance the centrifugal force of the fluid in the actuation chamber, or to the exterior of the shell depending upon the axial position of the second pulley cone in accordance with the speed ratio.

The axial position of the fluid outlet on the shaft may be so determined that the constricted end of the shell becomes substantially opposite the fluid outlet at a prescribed high, preferably maximum, ratio of the transmission input speed to output speed. The constricted end of the shell is so shaped that when the fluid issuing from the fluid outlet is thereby directed away from the counterbalance chamber and toward the desired parts of the transmission to be lubricated by the fluid. When the movable pulley cone travels away from the fixed pulley cone with the progress of upshifting, the constricted end of the shell admits the fluid into the counterbalance chamber of increasing capacity.

According to a further feature of the invention, the fluid passageway in the shaft communicates with a pressurized fluid source, preferably a lubrication pressure source, that is different from the mainline pressure source of the transmission. Advantageously, the lubrication pressure source can be communicated with the fluid outlet in the shaft via a fluid cooler positioned external to the transmission.

The above and other features and advantages of this invention and the manner of realizing them will become understood, from a study of the following description and appended claims, with reference to the attached drawings showing a preferable embodiment of the invention.

DESCRIPTION OF THE PREFERRED EMBODIMENT

Figure 1:
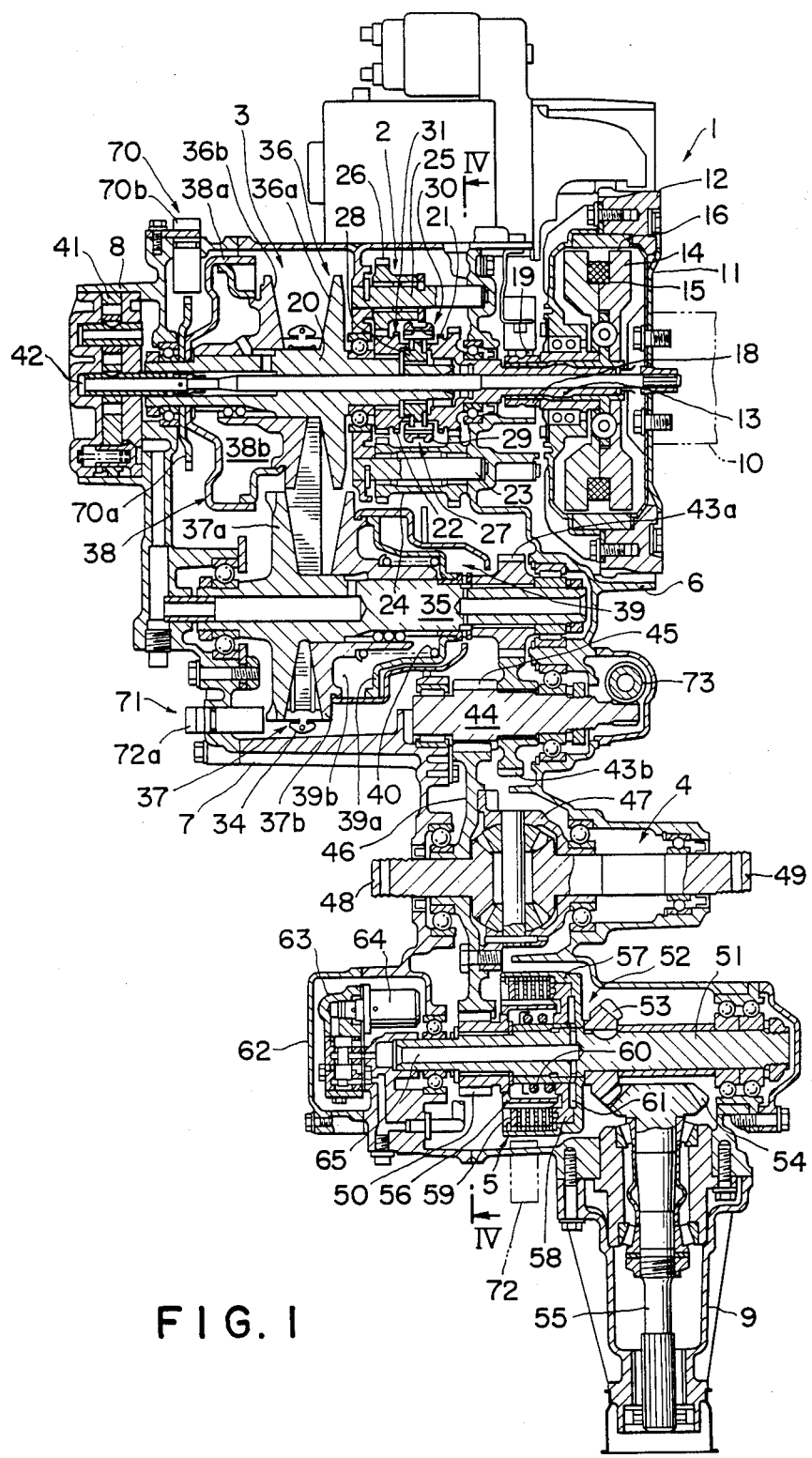
FIG. 1 is a section through a belt transmission for a front engine, four-wheel drive motor vehicle, the transmission embodying the principles of the invention and being shown together with a front differential and a transfer mechanism.

The infinitely variable belt transmission of the invention will now be described in more specific aspects thereof as adapted, by way of example only, for a front engine, four wheel drive motor vehicle. With reference first and in particular to FIG. 1, the automotive power train illustrated therein broadly comprises:

1 An electromagnetic powder clutch 1 for coupling and uncoupling the vehicle engine, not shown, to and from the transmission.

2. A forward/reverse select mechanism 2 for effecting a change between forward and reverse drives.

3. A variable diameter pulley and belt system 3 providing an infinitely variable speed drive.

4. A front differential mechanism 4 connected between the transmission and the front wheels, not shown, of the vehicle so as to permit one wheel to run at a different speed from the other.

5. A hydraulic transfer mechanism 5 for power transmission to the rear wheels, not shown, of the vehicle.

The above listed power train components are all accommodated in a space bounded by a main housing 7 together with a clutch housing 6 and an end or side cover 8 joined to the opposite ends or sides of the main housing. Additionally, an extension housing 9 is annexed to the rear, with respect to the direction of vehicle travel, of the clutch housing 6.

The electromagnetic powder clutch 1 is per se of conventional make comprising an annular drive member 12 and a disc-like driven member 14. The drive member 12 is rigidly coupled to an engine crankshaft 10 via a drive plate 11. The driven member 14 is spline-mounted on an transmission input shaft 13 for joint rotation therewith. The drive member 12 and the driven member 14 are adapted to provide an annular gap 16 therebetween in which there are confined particles, not shown, of a magnetizable metal. Concentrically mounted to the driven member 14, an electric clutch coil 15 is electrically connected to a slip ring 18 which is sleeved on the transmission input shaft 13 and electric clutch coil 15 is rigidly coupled to the driven member 14. The slip ring 18 makes electric contact with a feed brush assembly 19.

Thus, on energization via the slip ring 18 and feed brush assembly 19, the clutch coil 15 will produce magnetic flux. This flux will cause the metal particles to become chain-linked together in the annular gap 16 thereby smoothly establishing the driving engagement of the drive member 12 with the driven member 14. The subsequent deenergization of the clutch coil 15 will result in the demagnetization of the metal particles and hence in the disengagement of the clutch 1.

The clutch current may be controlled in association with the forward/reverse select mechanism 2 for automatic clutching during shifts from parking (P) or neutral (N) to drive (D) or "sporty drive" (Ds) or to reverse (R). No clutch pedaling is required.

The forward/reverse select mechanism 2 is connected between the transmission input shaft or clutch shaft 13 and, disposed in axial alignment with a primary shaft or transmission main shaft 20. This mechanism 2 comprises a reverse drive gear 21 which is mounted fast on the transmission input shaft 13 and which serves also as a forward driven member, and a reverse driven gear 22 rotatably mounted on the primary shaft 20. These gears 21 and 22 are interengaged via a counter gear 24 and an idler gear 26. The counter gear 24 is supported by a shaft 23 parallel to the primary shaft 20, and the idler gear 26 by another shaft 25 parallel to the primary shaft 20.

Interposed between the gears 21 and 22 is a gear selector 27 comprising a sleeve 29 which is splined to a hub 28 on the primary shaft 20. The noted gears 21, 22, 24 and 26 are in constant engagement and are coupled to the clutch driven member 14 with the coil 15 thereon. Therefore, upon disengagement of the clutch 1, these gears and clutch driven member are subject to inertial rotation by reason of their relatively great mass. The sleeve 29 is capable of selective engagement with the gears 21 and 22 via synchronizing devices 30 and 31.

Accordingly, in the P and N positions, the gear selector sleeve 29 is engaged with only the hub 28 on the primary shaft 20, with the consequent disconnection of the primary shaft from the transmission input shaft 13. The transmission can be conditioned for the D or Ds mode as the sleeve 29 is engaged with the gear 21 via the synchronizing device 30. Upon engagement of the sleeve 29 with the gear 22 via the synchronizing device 31, on the other hand, the transmission input shaft 13 becomes coupled to the primary shaft 20 via the gears 21, 22, 24 and 26. The transmission is then conditioned for the R mode, with the direction of engine rotation reversed and with the engine speed reduced.

Next to be referred to is the pulley and belt drive system 3. This drive system 3 comprises a variable diameter drive pulley 36 on the primary shaft 20, a variable diameter driven pulley 37 on a countershaft or secondary shaft 35 laid parallel to the primary shaft, and a V belt 34 extending around the drive and driven pulleys 36 and 37.

The drive pulley 36 comprises two conical-faced discs 36a and 36b defining in combination a V-groove for engagement with the belt 34, and the driven pulley 37 also comprises two similar cone faced discs 37a and 37b. These cone faced discs of the drive and driven pulleys will hereinafter be referred to as the pulley cones or simply as the cones. The pulley cones 36a and 37a are fixed whereas the other pulley cones 36b and 37b are movable towards and away from the fixed cones The movable pulley cones 36b and 37b are provided with hydraulic servo actuators 38 and 39, respectively, thereby to be controllably moved toward and away from the fixed cones 36a and 37a. The movable cone 37b of the driven pulley 37 is further provided with a helical compression spring 40 to be thereby laded toward the fixed cone 37a.

It is to be understood that in FIG. 1, the upper halves of the movable pulley cones 36b and 37b are shown displaced farthest away from the fixed pulley cones 36a and 37a. The effective diameters of the pulleys 36 and 37, or of the V-grooves defined thereby, are at a minimum when their movable cones are so positioned. The lower halves of the movable pulley cones are shown positioned closest to the fixed pulley cones. The effective diameters of the pulleys are then at a maximum.

As a source of hydraulic pressure needed for the operation of the servo actuators 38 and 39, there is employed in this particular embodiment a high pressure gear pump 41 mounted within the side cover 8. The pump 41 has a drive shaft 42 which rotatably extends through the primary shaft 20 and transmission input shaft 13 and which is coupled directly to the engine crankshaft 10. Being therefore constantly driven during engine operation, the pump 41 supplies the required hydraulic pressure to the servo actuators 38 and 39.

It is understood that a hydraulic control system, not shown, is conventionally provided for controlling the operation of the servo actuators 38 and 39 so as to infinitely very the effective diameters of the drive and driven pulley 36 and 37 in inverse proportion to each other. Thus the pulley and belt drive system 3 makes it possible to vary the speed ratio of the primary shaft 20 and secondary shaft 35 in a smooth stepless manner.

The overdrive "pulley ratio", that is, the ratio of the effective radius of the driven pulley 37 to that of the drive pulley 36 for high speed power transmission, is as small as approximately 0.5. Therefore, in consideration of the high rotational speed of the overdriving secondary shaft 35, as well as of the required direction of wheel rotation, the front deferential mechanism 4 is not directly coupled to the secondary shaft 35 but via an intermediate shaft or transmission output shaft 44. The secondary shaft 35 imparts rotation to the intermediate shaft 44 via two reduction gears 43a and 43b which are mounted respectively on the shafts 35 and 44. A drive pinion 45 on the intermediate shaft 44 meshes with a final drive gear 46 which in turn is coupled to a pair of front drive axles 48 and 49 via a differential 47.

The engine power must further be transferred to the rear pair of drive wheels in this four wheel drive vehicle. Employed toward this end is the transfer mechanism 5 comprising a transfer gear 50 in constant engagement with the final drive gear 46. The transfer gear 50 is rotatably mounted on a transfer shaft 51 extending transversely of the vehicle. The transfer gear 50 is capable of driving connection to the transfer shaft 51 via a wet type, hydraulically actuated multi-disc transfer clutch 52. A set of bevel gears 53 and 54 drivingly connects the transfer shaft 51 to a rear propeller shaft 55 which is laid longitudinally along the vehicle. The propeller shaft 55 transmits the engine power to the rear drive wheels in the well-known manner.

The transfer clutch 52 comprises a drive hub 56 rigidly coupled to the transfer gear 50 for joint rotation therewith, a driven drum 57 constrained to rotation with the transfer shaft 51, and a set of discs 59 arranged for frictional power transmission from drive hub 56 to driven drum 57. Acting on the clutch discs 59 is a piston 58 defining a fluid chamber 61 between itself and the clutch drum 57. A return spring 60 biases the piston 58 away from the clutch discs 59, normally holding the transfer clutch 52 disengaged. The piston 58 will overcome the spring bias as sufficient fluid pressure develops in the fluid chamber 61.

A clutch control valve 63 having a solenoid actuator 64 is mounted to the main housing 7 and enclosed in a valve cover 62 attached thereto. The valve 63 communicates with the fluid chamber 61 via a passageway 65 extending axially through the transfer shaft 51. Fed from the valve 63 to the fluid chamber 61, the fluid under pressure urges the piston 58 toward the clutch discs 59 in opposition to the force of the return spring 60 for controlling the transmissible torque of the transfer clutch 52.

It is understood that the variable diameter pulley system 3 and the transfer clutch 52 are both under automatic control of electronic circuitry, not shown, in this embodiment. In order to enable such electronic control, there are provided a primary pulley speed sensor 70 on the primary shaft 20, a secondary pulley speed sensor 71 on the driven pulley fixed cone 37a integral with the secondary shaft 35, and a rear wheel speed sensor 72 on the drum 57 of the transfer clutch 52. Seen at 73 is a speedometer drive gear engaging with the intermediate shaft 44.

Figure 2:
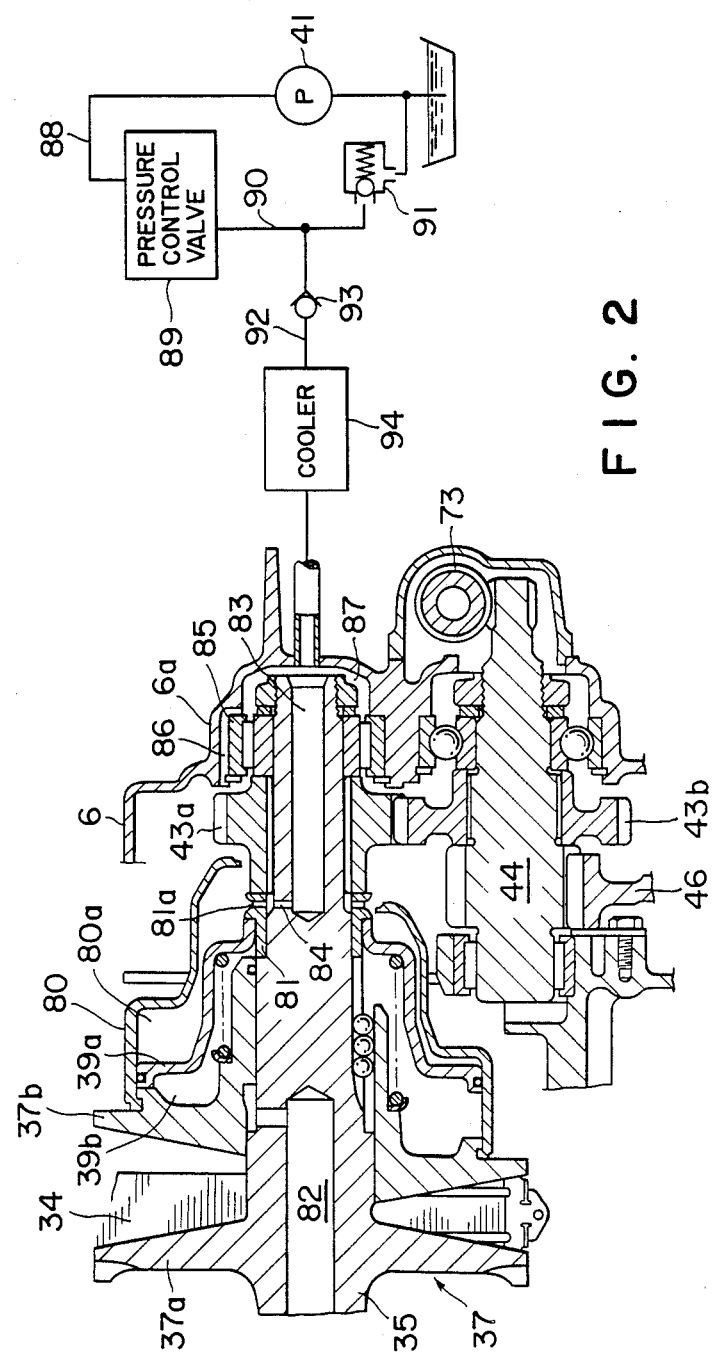
FIG. 2 is an enlarged detail view of part of the belt transmission of FIG. 1, the view showing in particular the driven pulley and hydraulic circuit means therewith.

Reference is now directed to FIG. 2 for a more detailed study of the driven pulley 37 of the variable diameter pulley system 3 and means associated therewith in accordance with the invention. In this figure, too, the upper half of the driven pulley movable cone 37b is shown displaced farthest away from the fixed cone 37a, and the lower half of the movable cone shown positioned closest to the fixed cone, for the ease of understanding of the driven pulley operation.

The movable cone 37b of the driven pulley 37 has, rigidly mounted to its side away from the fixed cone 37a, a shell 80 of substantially tubular shape concentrically surrounding the secondary shaft 35. Within the shell 80 there is mounted a partition 39a of similar shape but smaller size dividing the interior of the shell into a pulley actuation chamber 39b contiguous to the driven pulley movable cone 37b, and a counterbalance chamber 80a opposite to the actuation chamber 39b. The partition 39a has a constricted end abutting a fixed collar 81 on the secondary shaft 35, and an enlarged end slidably but pressure-tightly held against the inside surface of the shell 80. The collar 81 serves the additional purpose of retaining the gear 43a in place on the secondary shaft 35.

It is thus seen that the partition 39a is locked against axial displacement with respect to the secondary shaft 35, whereas the shell 80 is movable axially with the driven pulley movable cone 37b in sliding engagement with the partition. Therefore, upon axial displacement of the driven pulley movable cone 37b away from the fixed cone 37a for upshifting, the capacity of the actuation chamber 39b decreases and that of the counterbalance chamber 80a increases.

It is the fluid pressure in the actuation chamber 39b that acts on the driven pulley movable cone 37b to cause its axial displacement toward the driven pulley fixed cone 37a. The fluid in the counterbalance chamber 80a serves to counterbalance the axial component of the centrifugal force of the fluid in the actuation chamber 39b, particularly when the secondary shaft 35 is in rotation at high speed, holding the driven pulley movable cone 37b in a desired axial position on the secondary shaft.

As shown also in FIG. 2, the secondary shaft 35 has formed therein a mainline fluid passageway 82 and another fluid passageway 83, both passageways 82 and 83 extending axially of the secondary shaft. The mainline passageway 82 communicates with the actuation chamber 39b for conveying mainline fluid pressure thereto. The pressure in the actuation chamber 39b acts on the driven pulley movable cone 37b, causing its axial displacement toward the driven pulley fixed cone 37a.

Figure 3:
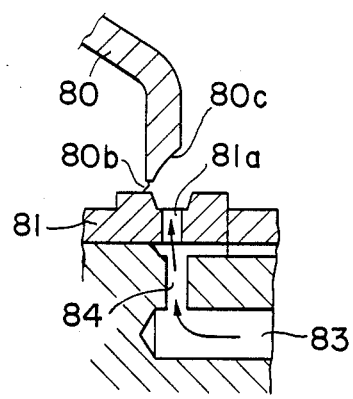
FIG. 3 is a still more enlarged detail view of part of the showing of FIG. 2.

As illustrated on an enlarged scale in FIG. 3, the other fluid passageway 83 in the secondary shaft 35 has one or more, (three in the illustrated embodiment), branch passageways 84 extending radially from its left hand end through the secondary shaft. These radial branch passageways 83 communicate with fluid outlets 81a in the collar 81. The fluid outlets 81a are open to the interior (counterbalance chamber 80a) or to the exterior of the enclosure 80 depending upon the axial position of the driven pulley movable cone 37b on the secondary shaft 35. The position of the fluid outlets 81a in the axial direction of the secondary shaft 35 constitutes an important feature of the invention, as described in more detail hereafter.

A reference back to FIG. 2 will reveal that the right hand end of the fluid passageway 83 is open to the space 87 bounded by part of the clutch housing 6. The space 87 communicates, on one hand, with the interior of the main housing 7 via a passageway 86 in a clutch housing portion 6a to which there is mounted a bearing 85 supporting the secondary shaft 35.

On the other hand, the space 87 communicates with a source of lubrication pressure via a conduit 92 having a check valve 93 and cooler 94. As is well known, in vehicle transmissions of this type, the pressurized fluid from the pump 41 is fed through a conduit 88 to a pressure control valve 89. This valve drains part of the incoming pressurized fluid to provide a desired mainline pressure. The drain port of the pressure control valve 89 is communicated with the inlet side of the pump 41 via a drain line 90 having a pressure control valve 91 to provide a source of lubrication pressure, totally independent of mainline pressure, needed for the lubrication of the pulley belts and other moving parts of the transmission. This embodiment utilizes this lubrication pressure for introducing the fluid into the counterbalance chamber 80a and, depending upon the axial position of the shell 80 on the secondary shaft 35, for lubricating some other parts of the transmission that will be set forth subsequently.

Thus the drain line 90 communicates with the space 87 via the check valve 93 and cooler 94 to supply the fluid under lubrication pressure into the axial passageway 83 in the secondary shaft 35 and thence to the outlets 81a via the radial passageways 84.

Figure 4:
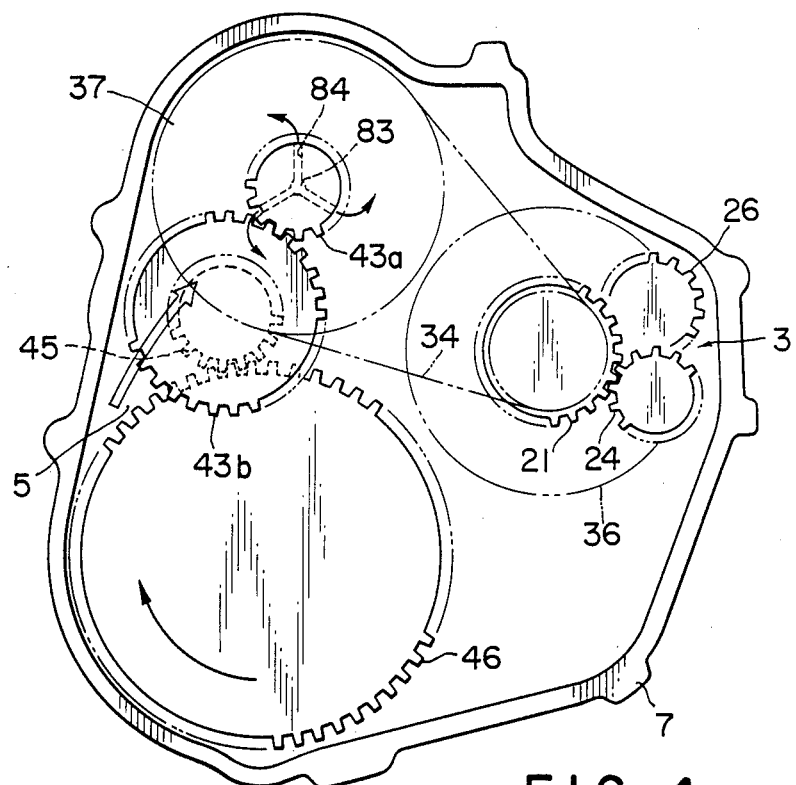
FIG. 4 is an enlarged diagrammatic cross section through the transmission of FIG. 1, taken along the line IV—IV in FIG. 1.

A consideration of FIG. 4 will show that, being coupled to the intermediate shaft 44 via the intermeshing gears 43a and 43b, the secondary shaft 35 of the pulley and belt drive system 3 is of necessity positioned above the level of the primary shaft 20. This relative placement of the primary and secondary shafts 20 and 35 gives rise to the possibility that the gears 43a, 43b, etc., may be poorly lubricated, particularly at low vehicle speed, because of insufficient splashing of oil by the final drive gear 46. It is also a well known fact that the centrifugal force of the fluid in the actuation chamber 39b is too negligible at low vehicle speed to justify counterbalancing it by the centrifugal force of the fluid in the counterbalance chamber 80a.

In view of the foregoing, the noted fluid outlets 81a have their position in the axial direction of the secondary shaft 35 determined in relation to the variable position of the shell 80 as hereinafter specified with reference to FIG. 3. As will be understood from this figure, taken together with FIG. 2, the position of the fluid outlets 81a is such that the constricted end 80b, directed away from the driven pulley 37, of the shell 80 is positioned substantially opposite, or just on the pulley side of, the fluid outlets 81a when the driven pulley 37 is conditioned for operation in the low speed range, preferably at the maximum speed ratio of the primary shaft 20 to the secondary shaft 35.

According to a further feature of the invention, the constricted end 80b of the shell 80 has formed therein an annular taper 80c which is directed away from the driven pulley 37. So tapered, the shell 80 provides a surface for directing the lubricating fluid toward the gear 43a on the secondary shaft 35 when positioned as shown in FIG. 3.

In operation, for vehicle travel in the low speed range, the mainline pressure from the pressure control valve 89 will be directed only into the actuation chamber 39b of the driven pulley 37. The fluid pressure in the actuation chamber 39b will act on the driven pulley movable cone 37b, causing the same to move closest to the fixed cone 37a, as represented by the bottom half of the movable cone in both FIGS. 1 and 2. The effective diameter of the driven pulley 37 is thus increased to a maximum. The effective diameter of the drive pulley 36, on the other hand, is at a minimum as its movable cone 36b is positioned farthest away from its fixed cone 36a, as represented by the top half of the drive pulley movable cone in FIG. 1. Now the infinitely variable speed drive system 3 is conditioned for operation in the low speed range, with the speed ratio of the pulleys 36 and 37 at the maximum.

For shifting up to a higher speed range, the mainline pressure will be fed into the actuation chamber 38b of the drive pulley 36 thereby displacing its movable cone 36b toward the fixed cone 36a. At the same time, the driven pulley movable cone 37b will gradually travel away from the fixed cone 37a. The pulleys 36 and 37 will be conditioned for overdrive as the drive pulley movable cone 36b comes closest to the drive pulley fixed cone 36a, as represented by the bottom half of the drive pulley movable cone in FIG. 1, whereas the driven pulley movable cone 37b moves farthest away from the driven pulley fixed cone 37a, as represented by its top half in FIGS. 1 and 2.

During such vehicle travel, the lubrication pressure will constantly develop on the drain line 90 of the pressure control valve 89 independently of the mainline pressure, it being understood that the pump 41 is driven from the vehicle engine. Cooled by the cooler 94, the lubricating fluid will flow into the axial passageway 83 in the secondary shaft 35 and, via the radial passageways 84 therein, will flow out of the fluid outlets 81a in the collar 81.

Let us suppose that the driven pulley movable cone 37b, together with the shell 80 attached thereto, gradually travels away from the fixed cone 37a for upshifting. As the constricted end 80b of the shell 80 travels past the fluid outlets 81a in the collar 81, the lubricating fluid will be admitted into the counterbalance chamber 80a. As the speed of rotation of the secondary shaft 35 increases with the progress of upshifting, so does the capacity of the counterbalance chamber 80a as well as the amount of the fluid contained therein.

During such high speed rotation of the secondary shaft 35, the fluid in the actuation chamber 39b will centrifugally act on the driven pulley movable cone 37b, tending to displace the same toward the driven pulley fixed cone 37a, the partition 39a being locked against axial displacement of the driven pulley movable cone 37b in the direction away from the driven pulley 37. However, at the same time, the centrifugal force of the fluid in the counterbalance chamber 80a of increased capacity will act on the shell 80 of stepped tubular shape, causing the same to exert a pull on the driven pulley movable cone 37b. The centrifugal force of the fluid in the counterbalance chamber 80a therefore counteracts that of the fluid in the actuation chamber 39b.

During vehicle travel in the low speed range, with the "pulley ratio" of the drive system 3 at the maximum, the constricted end 80b of the shell 80 will nearly discommunicate the counterbalance chamber 80a from the fluid outlets 81a in the collar 81. The lubricating fluid will then be hardly admitted into the counterbalance chamber 80a; instead, guided by the taper 80c in the enclosure 80, the lubricating fluid will be directed away from the driven pulley 37 for lubricating the reduction gears 43a and 43b, bearing 85, etc., which are located above the level of the primary shaft 20.

Despite the foregoing detailed disclosure, it is not desired that the invention be limited by the exact details of the illustrated embodiment, for a variety of modifications or alterations will be apparent to one skilled in the art. For instance, the fundamental concepts of the invention may be applied not only to the driven pulley but also to the drive pulley of the variable diameter pulley system Further, although the pulley system is herein shown incorporated in a transmission with an electromagnetic powder clutch, it lends itself to use with hydraulic torque converters, mechanical clutches, etc. Additional changes of this disclosure may be resorted to without departing from the scope of the invention.

What is claimed is:

1. In an infinitely variable speed transmission of the type having a variable diameter pulley system, in combination:
    (a) a rotatable shaft;
    (b) a first pulley cone mounted on the shaft for joint rotation therewith and restrained from axial displacement relative to the shaft;
    (c) a second pulley cone mounted on the shaft for joint rotation therewith and for axial displacement relative to the shaft toward and away from the first pulley cone;
    (d) a substantially tubular shell coaxially surrounding the shaft and having an enlarged end rigidly attached to the second pulley cone and a constricted end loosely fitted over the shaft;
    (e) a fluid-tight partition rigidly mounted on the shaft for dividing the interior of the shell into an actuation chamber contiguous to the second pulley cone and a counter-balance chamber opposite the actuation chamber, the actuation chamber being supplied with fluid under pressure for controllably moving the second pulley cone, together with the shell attached thereto, toward and away from the first pulley cone;
    (f) there being a fluid passageway in the shaft which has a fluid outlet in such an axial position on the shaft that the constricted end of the shell directs the fluid issuing from the fluid outlet either into the counterbalance chamber, in order to counterbalance the centrifugal force of the fluid in the actuation chamber, or to the exterior of the shell depending upon the axial position of the second pulley cone with respect to the first pulley cone.

2. The transmission of claim 1 wherein the constricted end of the shell is shaped to provide a surface for directing the fluid issuing from the fluid outlet, in a direction away from the first and second pulley cones.

3. In an infinitely variable speed belt transmission, in combination:
    (a) a primary shaft;
    (b) a variable diameter drive pulley comprising:
        (1) a fixed cone mounted on the primary shaft for joint rotation therewith and restrained from axial displacement relative to the primary shaft; and
        (2) a movable cone mounted on the primary shaft for joint rotation therewith, the movable cone being movable toward and away from the fixed cone in order to vary the effective diameter of the drive pulley;
    (c) a secondary shaft parallel to the primary shaft;
    (d) a variable diameter driven pulley comprising:
        (a) a fixed cone mounted on the secondary shaft for joint rotation therewith and restrained from axial displacement relative to the secondary shaft; and
        (b) a movable cone mounted on the secondary shaft for joint rotation therewith, the movable cone being movable toward and away from the driven pulley fixed cone order to vary the effective diameter of the driven pulley;
    (e) an endless belt extending around the drive and driven pulleys for imparting the rotation of the primary shaft to the secondary shaft at a speed ratio depending upon the relative effective diameters of the drive and driven pulleys;
    (f) a substantially tubular shell coaxially surrounding the secondary shaft and having an enlarged end rigidly attached to the driven pulley movable cone and a constricted end loosely fitted over the secondary shaft;
    (g) a partition rigidly mounted on the secondary shaft for fluid tightly dividing the interior of the shell into an actuation chamber contiguous to the driven pulley movable cone and a counterbalance chamber opposite to the actuation chamber, the actuation chamber being supplied with fluid under pressure for controllably moving the driven pulley movable cone, together with the shell attached thereto, toward and away from the driven pulley fixed cone;

(h) there being a fluid passageway in the secondary shaft which has a fluid outlet in such an axial position on the secondary shaft that the constricted end of the shell is positioned substantially opposite the fluid outlet at a prescribed high speed ratio of the primary shaft to the secondary shaft in order to direct the fluid issuing under pressure from the fluid outlet to the exterior of the shell, the constricted end of the shell admitting the pressurized fluid from the fluid outlet into the counterbalance chamber in order to counterbalance the centrifugal force of the fluid in the actuation chamber when the driven pulley movable cone travels away from the driven pulley fixed cone to make the speed of rotation of the secondary shaft higher than that at the prescribed high speed ratio.

4. The transmission of claim 3 wherein the constricted end of the shell is shaped to provide a surface for directing the fluid issuing from the fluid outlet, in a direction away from the driven pulley.

5. The transmission of claim 3 wherein the actuation chamber is supplied with the pressurized fluid from a source of mainline pressure, and wherein the counterbalance chamber is supplied with the pressurized fluid from a source of lubrication pressure.

* * * * *